United States Patent [19]

Coué

[11] Patent Number: 4,625,835
[45] Date of Patent: Dec. 2, 1986

[54] DEVICE FOR MOUNTING AND FIXING A BRAKE ON A CYCLE

[75] Inventor: Maurice E. L. Coué, Feucherolles, France

[73] Assignee: Huret et ses Fils, Nanterre, France

[21] Appl. No.: 623,429

[22] Filed: Jun. 22, 1984

[30] Foreign Application Priority Data

Jul. 1, 1983 [FR] France ................. 83 11017

[51] Int. Cl.⁴ .................. B62L 1/00; B62K 19/38
[52] U.S. Cl. .................. 188/24.11; 188/24.12
[58] Field of Search ............. 188/24.11, 24.12, 24.13, 188/24.14, 24.15, 24.16, 24.17, 24.18, 24.19, 24.21, 24.22; 403/329, 361

[56] References Cited

U.S. PATENT DOCUMENTS 937,402 10/1909 Wood et al. ................. 403/329
4,305,482 12/1981 Arai ................. 188/24.19

FOREIGN PATENT DOCUMENTS 7907021 3/1981 Netherlands ................. 188/24.11
0014686 of 1897 United Kingdom ............. 188/24.11
444227 3/1936 United Kingdom .

Primary Examiner—Douglas C. Butler
Assistant Examiner—Alvin Oberley
Attorney, Agent, or Firm—Trexler, Bushnell & Wolters, Ltd.

[57] ABSTRACT

The device avoids the use of screw-and-nut and facilitates the operations for mounting and dismantling the brakes. It comprises a support (10) for the brake (6) provided with tab (12) capable of engaging and resiliently clipping into a cavity (5) of the fork (3).

4 Claims, 3 Drawing Figures

DEVICE FOR MOUNTING AND FIXING A BRAKE ON A CYCLE

BACKGROUND OF THE INVENTION

The present invention relates to devices for mounting and fixing brakes on two-wheeled vehicles and, in particular, cycles.

These brakes usually comprise a caliper which straddles the wheel to be braked, the two branches of the caliper carrying at their ends brake pads and being mounted to pivot about a pin so as to move these brake pads toward or away from the wheel rim. In known arrangements, these brakes are secured to the frame of the cycle, in the present instance on the front fork or on a brace connecting the stays of the frame, at the rear, by screw-and-nut devices. Although such a fixing device has been employed for a very long time, it has, in this particular application, several drawbacks:

first, it has for effect to complicate the mounting operations since the brakes must be delivered with their fixing screw and thier nut tightened, and consequently the constructor must separate the nut and the screw, engage the latter and then fix the nut again on the screw;

the access to the nut is not always easy owing to its position behind the fork or behind the brace connecting the stays; of course, the same drawback exists when the brakes must be dismantled;

a relatively high cost results bearing in mind that time required for these various operations.

OBJECTS AND SUMMRY OF THE INVENTION

An object of the invention is to provide a device for mounting and fixing which overcomes these drawbacks.

The invention therefore provides a device for mounting and fixing a brake on a cycle, wherein the brake is connected to a support supplied with resiliently yieldable clipping means cooperative with complementary means carried by the part of the cycle on which the brake must be mounted.

According to other features:

the support has a tab and the part of the cycle on which the brake must be mounted defines a cavity of complementary shape in which the tab can be resiliently clipped into position;

said tab includes a rigid portion locked in the cavity and a resiliently deformable portion which ensures the clipping together and the retention of the brake relative to said part of the cycle.

THE DRAWINGS

The invention will be described in more detail hereinafter with reference to an embodiment illustrated in the accompanying drawings, in which.

DETAILED DISCLOSURE OF THE ILLUSTRATED EMBODIMENT OF THE INVENTION

Figure 1:
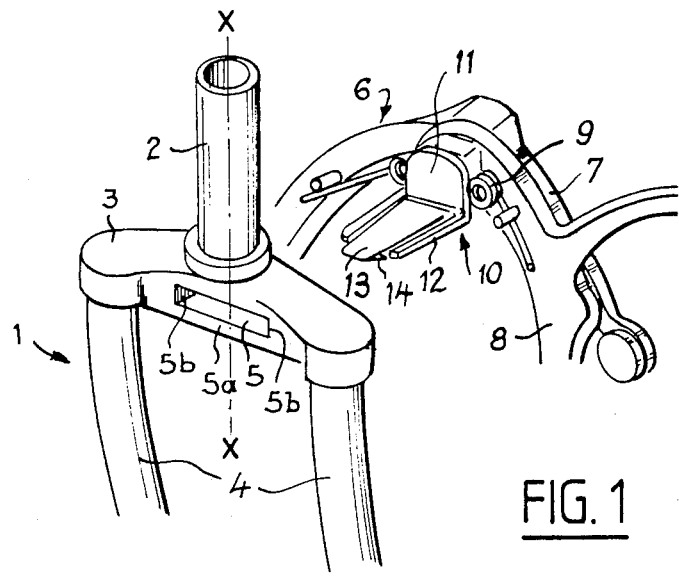
FIG. 1 is a partial perspective view of a front brake mounting device according to the invention.
Figure 2:
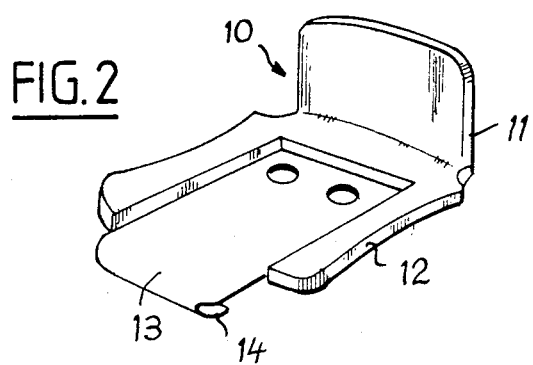
FIG. 2 is a perspective view of the brake support employed in FIG. 1.

The drawing shows a part of a front fork 1 of a cycle comprising an upper tube 2 having an axis X—X terminating in a transverse member 3 from which extend the two branches 4 of the fork. Defined in the transverse member 3 is a cavity 5 which extends throughout this member 3 and in a direction perpendicular to the axis X—X of the fork. This cavity may have a constant section or a section which tapers from its front part to its rear part, the front part corresponding to the part facing the front of the cycle. The brake is received on this front part.

The brake, which will not be described in detail, comprises a caliper 6 whose two branches 7, 8 are pivotally mounted in the known manner and are controlled in the known manner by means of a cable (not shown).

These two branches are biased toward a separated position by a return spring 9.

Figure 3:
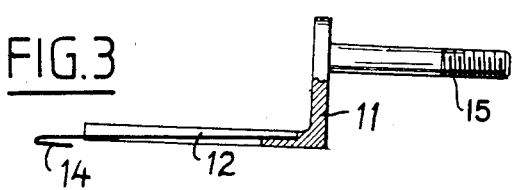
FIG. 3 is a longitudinal section view of this support.

According to the invention, the brake is carried by a support 10 having a generally L shape, a branch 11 of which acts as the support proper for the caliper and the other branch 12 of which acts as mounting and fixing means on the fork. The branch 11 may carry a welded stud 15 (FIG. 3) which acts as a pivot pin for the branches of the caliper, or may have a tapped orifice in which said pivot pin is screwed. The second branch of the support comprises a central strip or tongue portion 13 which may be mounted on the support or is preferably in one piece with the support and has a certain resilience in a direction perpendicular to the plane of the branch 12. This central tongue portion or strip 13 has, at its free end, a projecting portion 14 which is adapted to constitute a clipping means and cooperates with the lower edge 5a of the cavity 5 when the support has been engaged in the latter.

Such a device is very simple to use. The completely mounted brake is fixed on the fork by engaging the tab 12 in the cavity 5. At the end of the travel, the hook or the projecting portion 14 clips behind the edge 5a on the transverse member and thus positively maintains the brake in position relative to the fork.

The brake can be dismantled by retracting the tongue portion 13 so as to disengage the hook 14 and by withdrawing the tab 12 from the cavity 5.

This fixing device has the advantage of eliminating any screwed connection between the brake and the fork and of substantially simplifying the mounting operations. Further, as the cavity 5 is formed in the thickness of the transverse member of the fork, it requires an additional member.

It will be understood that other embodiments may be envisaged, in particular as concerns the clipping means. For example, the tab 12 may merely have two branches having a certain lateral resilience, and terminating at their free ends in hooks which engage on the vertical edges 5b of the cavity 5.

The support may be in one piece with one of the branches of the caliper so as to still more decrease the number of parts.

The positions of the tab and the cavity may be reversed, the tab being connected to the fork and the cavity formed in the support of the brake or in an element of the latter.

The same arrangement may also be employed for mounting a rear brake on a brace connecting the stays of the frame.

What is claimed is:

1. A device for mounting and fixing a caliper type brake on a part of a cycle, said device comprising an L-shaped support comprising a first upright flange portion having a pivot pin thereon and perpendicular thereto for mounting a caliper type brake and a second substantially horizontal portion defining a tab, said tab including a rigid portion including a base and a pair of spaced coplanar legs extending therefrom opposite to said pivot pin and defining an open space therebetween for locking engagement in a cavity of complementary shape in said cycle part, said tab further including a resiliently yieldable tongue portion anchored at oen end to said base and extending therefrom in said open space and having a latch portion thereon extending out of the plane of said legs and engageable with said part of the cycle for maintaining the support on said part of the cycle.

2. A device according to claim 1, wherein the tab and the cavity have convergent complementary shapes.

3. A device accoring to claim 1, wherein the cavity is formed in a transverse member of a fork of the cycle.

4. A device according to claim 3, wherein the cavity extends in a direction substantially perpendicular to the axis of the fork.

* * * * *